United States Patent
Freeman et al.

(10) Patent No.: US 7,747,614 B2
(45) Date of Patent: Jun. 29, 2010

(54) DIFFERENCE CONTROL FOR GENERATING AND DISPLAYING A DIFFERENCE RESULT SET FROM THE RESULT SETS OF A PLURALITY OF SEARCH ENGINES

(75) Inventors: Jackie Andrew Freeman, San Jose, CA (US); Tony Sang-min Lee, Palo Alto, CA (US); David M. Ciemiewicz, Mountain View, CA (US); Hal Schectman, Portola Valley, CA (US); Apostolos Karmirantzos, Sunnyvale, CA (US); James Michael Reinhold, Berkeley, CA (US); David Simpson, San Francisco, CA (US); Gregory M. Makris, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 153 days.

(21) Appl. No.: 11/264,740

(22) Filed: Oct. 31, 2005

(65) Prior Publication Data

US 2007/0100822 A1     May 3, 2007

(51) Int. Cl.
*G06F 17/30* (2006.01)
(52) U.S. Cl. .................... 707/722; 707/707
(58) Field of Classification Search .............. None
See application file for complete search history.

(56) References Cited

U.S. PATENT DOCUMENTS

| | | | |
|---|---|---|---|
| 5,832,520 A | 11/1998 | Miller | |
| 6,101,491 A | 8/2000 | Woods | |
| 6,347,314 B1 | 2/2002 | Chidlovskii | |
| 6,393,415 B1 * | 5/2002 | Getchius et al. | 707/2 |
| 6,633,867 B1 * | 10/2003 | Kraft et al. | 707/3 |
| 6,886,009 B2 | 4/2005 | Jeng et al. | |
| 7,243,102 B1 | 7/2007 | Naam et al. | |
| 2002/0069194 A1 * | 6/2002 | Robbins | 707/3 |
| 2002/0078147 A1 * | 6/2002 | Bouthors et al. | 709/203 |
| 2002/0107847 A1 * | 8/2002 | Johnson | 707/3 |
| 2003/0033295 A1 * | 2/2003 | Adler et al. | 707/3 |
| 2004/0024756 A1 * | 2/2004 | Rickard | 707/3 |
| 2006/0047620 A1 * | 3/2006 | Branson et al. | 707/1 |
| 2006/0195406 A1 * | 8/2006 | Burges et al. | 706/12 |
| 2007/0112759 A1 * | 5/2007 | Kulakow et al. | 707/5 |

OTHER PUBLICATIONS

Agupta, DoubleTrust, Jun. 6, 2005, www.doubletrust.net.*

* cited by examiner

*Primary Examiner*—Neveen Abel Jalil
*Assistant Examiner*—Son T Hoang
(74) *Attorney, Agent, or Firm*—Seth H. Ostrow, Esq.; Ostrow Kaufman & Frankl LLP (57) ABSTRACT

The present invention is directed towards systems and methods for generating and displaying the difference between a primary result set and a secondary result set. According to the present invention, a method for displaying the difference between a primary result set and a secondary result set for a query comprises generating a primary result set and a secondary result set, the primary result set and secondary result set generated according to one or more respective disparate search algorithms. A difference result set is determined according to a difference between items in the primary result set and second result set, which is displayed to a user.

5 Claims, 10 Drawing Sheets

DIFFERENCE CONTROL FOR GENERATING AND DISPLAYING A DIFFERENCE RESULT SET FROM THE RESULT SETS OF A PLURALITY OF SEARCH ENGINES

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to a system and method for comparing result sets that are responsive to searches over a corpus of documents. More particularly, the present invention relates to systems and methods for generating and presenting a difference result set comprising items selected according to a difference between a primary result set and a secondary result set.

When using search engines made available by commercial search providers, users are not always satisfied with the search results that these search engines generate. In an attempt to overcome perceived shortcomings with available search engines, meta-search engines provide aggregate results from a plurality of search engines to generate a meta-result set by determining the union of the result sets from a plurality of search engines. These meta-search engines, however, apply proprietary ranking algorithms to the meta-result set, which may result in items that are potentially relevant to a given user receiving a low ranking and therefore not being utilized.

What is therefore needed are systems and methods that allow a user to view a difference result set comprising differences between a result set generated by a first search engine using a first search and rank algorithm, and a secondary result set generated by a second search engine using a second search and rank algorithm. Systems and methods are also needed to track selections in the difference result set, which may be used in improving the searching and ranking of items by the first search engine.

SUMMARY OF THE INVENTION

The present invention is directed towards systems and methods for the generation and presentation of a difference between a primary result set and a secondary result set. According to one embodiment, the invention is directed towards a method for influencing a search algorithm in the generation of a result set. According to the present embodiment, the method comprises receiving a primary result set and a secondary result set in response to a search query, the primary result set and secondary result set each comprising one or more items, and determining a difference between the one or more items in the primary result set and the one or more items in the secondary result set for storage as a difference result set. An item in the difference result set is selected, and an indication of the selected item is stored for use in influencing items contained in a result set. According to one embodiment, a search engine that generated the primary result set generates the result set.

Receiving the primary result set may comprise a first search engine generating the first result set and receiving a secondary result set may comprise a second search engine generating the secondary result set. Furthermore, generating the primary result set and the secondary result set may comprise generating the primary result set according to a first search algorithm and generating the secondary result set according to a second search algorithm. A user profile may be provided in which a user identifies a preferred search engine from which to generate the secondary result set. Alternatively, a default preferred search engine may be used.

Determining the difference result set may be accomplished according to a variety of techniques. According to one embodiment, determining the difference result set comprises determining the difference according to URL matching. Alternatively, determining the difference result set may comprise crawling one or more pages identified by one or more items in the primary result set and the secondary result set to determine one or more page signatures and comparing the one or more page signatures to determine a duplicate page. Duplicate pages are eliminated from the difference result set. Feedback may also be elicited from a user regarding the selection of an item in the difference result set.

The method of the present invention is further applicable to searches for all forms and types of media content. For example, the primary and secondary result sets may comprise result sets generated in response to searches for items of audio content. Similarly, the primary and secondary result sets may comprise result sets generated in response to searches for items of video content, image content, text content, as well as combinations thereof.

The present invention is also directed towards a method for the presentation of a difference between a primary result set and a secondary result set. According to one embodiment, a method for displaying the difference between one or more result sets for a query comprises generating a primary result set and a secondary result set, each of the primary and secondary result sets generated according to one or more respective disparate search algorithms. A difference result set is determined according to a difference between items in the primary result set and secondary result set. The difference result set is displayed to a user, which may comprise displaying a difference control to the user, selection of the difference control causing the display of the difference result set.

The difference control may be selectively displayed to the user. According to one embodiment, determination of whether the difference control is to be displayed to a given user comprises determining if the user is a registered user and, if the user is a registered user, displaying the difference control. Alternatively, the determination of whether the difference control is to be displayed to a given user comprises retrieving a past observed behavior of the user and displaying the difference control on the basis of the past observed behavior satisfying one or more criteria. Retrieving the past observed behavior may comprise retrieving the past observed behavior from a user profile for the user.

The present invention is also directed towards a method for presenting a result set with an indication of an item that is exclusive to the result set. The method comprises receiving a primary result set and a secondary result set in response to a search query, the primary result set and secondary result set each comprising one or more items. A determination is made to determine an exclusive item contained in the primary result set that is not contained in the secondary result set. The primary result set is displayed to the user and an indication is displayed with the exclusive item, indicating that the exclusive item is contained in the primary result set and not contained in the secondary result set, e.g., the item is exclusive to the primary result set. The indication may comprise displaying an icon, which may be an animated icon, and may alternatively or in conjunction comprise displaying text or other indications. In addition to the foregoing, or in conjunction, the method may comprise indicating common items between the primary and secondary result sets.

Determining according to one embodiment comprises determining a difference between the one or more items in the primary result set and the one or more items in the secondary result set. The primary result set may be generated according to a first search algorithm and the secondary result set generated according to a second search algorithm. According to one embodiment, the method comprises eliciting feedback from a user regarding the selection of the exclusive item, which may comprise recording the selection of the exclusive item and/or modifying the ranking of the exclusive item in the primary result set on the basis of the elicited feedback.

A check may be performed to determine if the user is a registered user. Where the user is not a registered user, the indication is not displayed to the user with the exclusive item. The past observed behavior of the user may also be retrieved and the indication displayed to the user with the exclusive item on the basis of the past observed behavior. The past observed behavior for the user may be retrieved from a profile for the user.

The present invention is further directed to methods for determining a result set on the basis of sequential searches to determine differences between the sequential searches. According to one embodiment, the method comprises receiving a primary result set comprising one or more items in response to a first search query, the first search query comprising a first set of one or more search terms. A secondary result set comprising one or more items is received in response to a second search query, the second search query comprising a second set of one or more search terms that are a derivative of the first set of one or more search terms. A difference is determined between the one or more items in the primary result set and the one or more items in the secondary result set to determine a difference result set, the difference result set comprising one or more items. The one or more items in the difference result set are displayed to the user. According to one embodiment, receiving a primary result set and a secondary result comprises receiving two sequential searches.

The present method may further comprise receiving a tertiary result set comprising one or more items in response to a third search query, the third search query comprising a third set of one or more terms that are a derivative of the second set of one or more search terms. A difference result set is determined on the basis of the difference between the one or more items in the tertiary result set and the one or more items in the difference result set to determine a secondary difference result set, the secondary result set comprising one or more items. The one or more items in the secondary difference result set are displayed to the user. According to one embodiment, receiving a primary result set, a secondary result and tertiary result set comprises receiving three sequential searches. The result sets may be generated according to similar or disparate search algorithms.

A difference button may be selectively displayed to a user, the selection of which initiates display of the difference result set. A check may be performed to determine if the user is a registered user and, if the user is a registered user, display the difference button. The check may further comprise retrieving a past observed behavior of the user and displaying the difference button on the basis of the past observed behavior.

According to one embodiment, retrieving the past observed behavior comprises retrieving the past observed behavior from a profile for the user.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
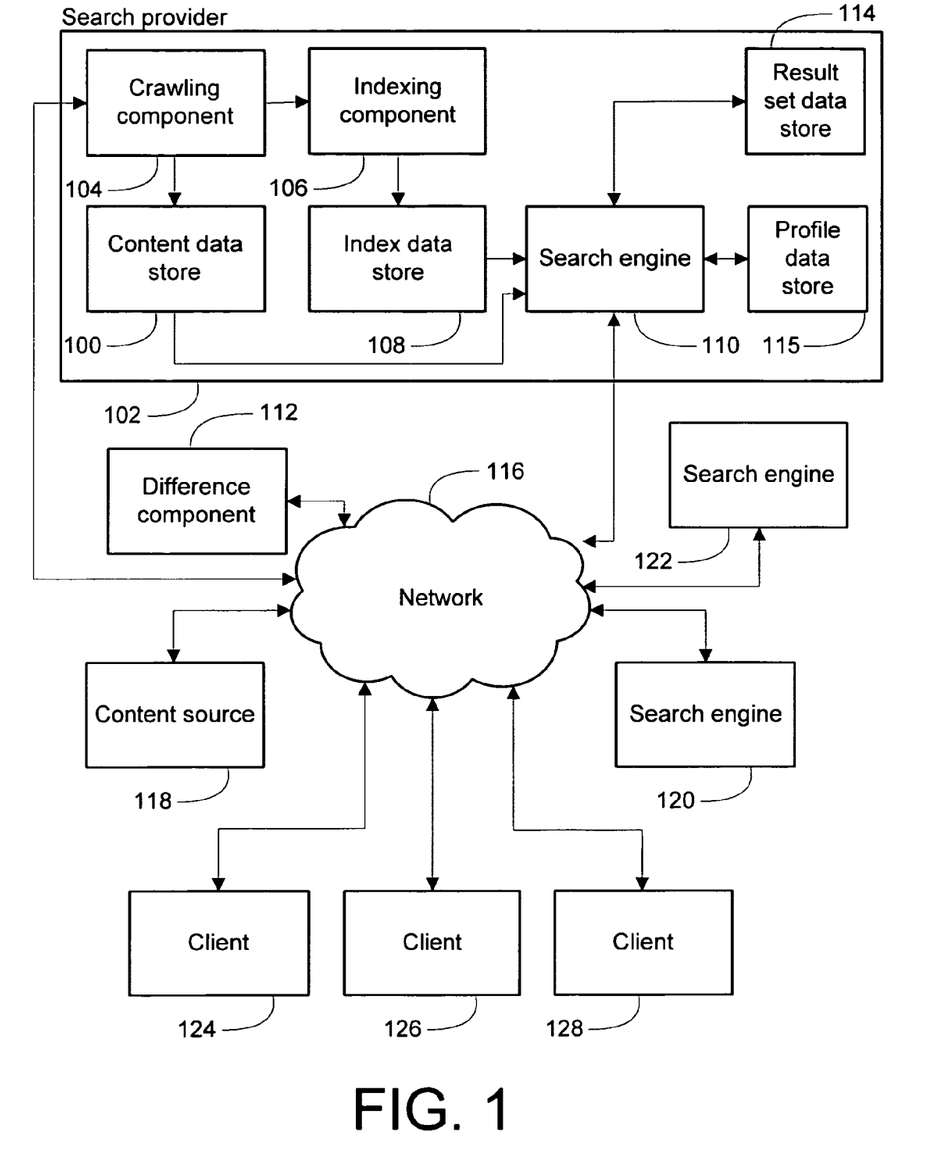
FIG. 1 is a block diagram illustrating a system architecture for the generation and presentation of a difference result set generated on the basis of a difference between a primary result set and a secondary result set according to one embodiment of the present invention.

With reference to FIGS. 1 through 7, embodiments of the present invention are shown. FIG. 1 presents a block diagram illustrating the components of a system for generating and presenting a difference result set on the basis of a difference between a primary result set and a secondary result set, which may comprise one or more secondary result sets. Although the embodiment presented in FIG. 1 illustrates these components in a networked environment, it should be understood by those of skill in the art that the invention is not limited to networked environments, and may also be implemented on a stand-alone computer or electronic device. Furthermore, although FIG. 1 illustrates a number of client and server components, the invention is not limited to the use of multiple components, and all functionality regarding the same may be provided by a lesser or greater number of components, depending, for example, on scalability requirements.

As shown, the system of FIG. 1 includes a search provider 102, a network 116, one or more content sources 118, one or more search engines 120 and 122 that are remotely located from the search provider 102, and one or more clients 124, 126 and 128. The search provider 102 allows clients 124, 126 and 128 to search for and identify content items of interest that are hosted by the one or more content sources 118. To allow clients 124, 126 and 128 to search for content items from the one or more content sources, the search provider 102 makes use of a number of components, which may include a crawling component 104, an indexing component 106, an index data store 108, and a search engine 110.

The search provider 102 is communicatively coupled to a network 116, which may include a connection to one or more local and/or wide area networks, such as the Internet. Using communication pathways that the network 116 provides, the crawling component 104 is capable of accessing sources of content 118, as well as information regarding and describing the same, which is referred to herein as metadata. The crawling component 104 communicates with content sources 118 for maintaining cached copies of the content and metadata in a content data store 100. The collection of content and metadata from content sources 118 is referred to as "crawling", and is the process by which the crawling component 104 collects information upon which the search engine 110 performs searches. Exemplary methods for crawling information on a network are described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

The crawling component 104 crawls content located on content sources 118 in communication with the network 116, such as the Internet, collecting content and information regarding the same. An indexing component 106 parses and indexes content and related information that the crawling component 104 collects through the crawling process. The indexing component 106 generates an index that defines a structure for the content and metadata that allows for location and retrieval of the content and metadata. According to one embodiment of the invention, the index component 106 creates an index of word-location pairs that allows a search engine 110 to determine specific items of content and metadata regarding the same in response to a query from a client 124, 126 and 128, which may be from a user, software component, automated process, etc. Exemplary methods for indexing information is described in commonly owned U.S. patent application Ser. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. Index information that the index component 106 generates is written to an index data store 108 for persistent storage and use by other components of the search provider 102.

The search engine 110 receives search requests from client devices 124, 126 and 128 communicatively coupled to the network 116. A client device 124, 126 and 128 may be any device that allows for the transmission of search requests (a query or query fragment) to a search provider 102, as well as receipt of result sets from the search provider 102. According to one embodiment of the invention, a client device 124, 126 and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 124, 126 and 128 may run software applications, such as a web browser, which provide for transmission of search requests as well as receipt and display of result sets.

When the search engine 110 receives a search request, or query, from a given client 124, 126 and 128, the search engine 110 investigates the index in the index data store 108 to identify content that is responsive to the query that the search engine 110 receives. The search engine 110 generates a primary result set that comprises links to content falling within the scope of the query. To present the client 124, 126 and 128 with the most relevant items in the result set, the search engine 110 may rank the items in the result set. Exemplary systems and methods for ranking search results are described in commonly owned U.S. Pat. No. 5,765,149, entitled "MODIFIED COLLECTION FREQUENCY RANKING METHOD," the disclosure of which is hereby incorporated by reference in its entirety.

According to the embodiment illustrated at FIG. 1, the search engine 110 is operative to interface with a difference component 112 for determining a difference result set on the basis of a difference between a primary result set and a secondary result set. According to one embodiment of the invention, the search engine 110 at the search provider 102 receives a query directly from a user and generates the primary result set, and one or more search engines 120 and 122 located remotely from the search provider 102 generate one or more secondary result sets. The difference component 112 receives the query from the search engine 110 and queries a result set data store 114 to identify one or more secondary result sets. Alternatively, the difference component 112 may operate in conjunction with one or more search engines 120 and 122 that are located remotely from the search provider 102 to generate one or more secondary result sets.

A search engine 120 and 122 that is located remotely from the search engine 110 at the search provider 102 produces one or more secondary result sets. The search engine 120 and 122 that generates a secondary result set preferably generates the secondary result set according to a search algorithm that is different from the search algorithm that the search provider 102 uses to generate the primary result set. Accordingly, the difference result set allows the user to determine any differences between the outputs of the two algorithms and may therefore objectively judge the superiority of the two algorithms. For example, where the search engine that generates the primary result set is the Yahoo! Search engine and the MSN Search engine generates the secondary result set, the difference component 112 may generate a difference result set on the basis of differences between the two result sets.

The difference component 112 is operative to periodically query one or more search engines 120 and 122, storing the queries and associated secondary result sets in a result set data store 114. Alternatively, secondary result sets, as well as difference result sets, may be maintained at one or more client devices 124, 126 and 128. It should also be noted that a given secondary result set may be rerun and updated over time, e.g., every day. According to one embodiment, the difference component 112 receives detailed information from the search engine 110 regarding queries that users have been submitting to the search engine over a given period of time, e.g., the past day, the past week, etc. On the basis of this information, the difference component 112 instructs the search engine to execute one or more queries.

The difference component 112 stores the result sets for the one or more queries in the result set data store 114, which may comprise storing the result sets on a per search engine basis, as is explained in greater detail herein. For example, the search engine 110 may determine the top one hundred most popular queries for the past week, which it provides as a list or other data file or structure to the difference component 112. The difference component 112 uses the list that it receives from the search engine 110 to query other search engines 120 and 122, storing the queries and associated result sets in the result set data store 114 on a per search engine basis.

As an alternative, the difference component 112 may be comprised of or make use of programming logic at clients 124, 126 and 128 in collecting and generating one or more secondary result sets, or other functionality of the difference component described herein. According to one embodiment, a client 124, 126 and 128 utilizes a toolbar that provides client-side difference component logic, for example the Yahoo! Toolbar, which is a plug-in for multiple browser platforms that provides server accessible client-side logic, in addition to other functionality. When the user submits a query to the search engine 110, the difference component 112 instructs the client-side logic (or client-side logic located at the client device in the absence of instructions from the difference component 112) to submit the query to other search engines 120 and 122, which the client 124, 126 and 128 receives and forwards to the service provider 102 for storage in the result set data store 114. Accordingly, the result set data store 114 maintains result sets for a number of queries from different search engines 120 and 122. It should be noted by those of skill in the art that the logic of the difference component may be distributed, reside locally on a given client device 124, 126 and 128, or combinations thereof, e.g., a client performing URL matching with the difference component performing signature analysis as is described in greater detail herein.

The difference component 112 may request one or more secondary result sets through the use of client-side scripting code that the search engine 110 provides to clients 124, 126 and 128 as part of the user interface for submitting search queries and receiving primary result sets. When the user selects a given control that the search engine 110 provides as part of the user interface, client-side code, e.g., JavaScript, may query other search engines 120 and 122 using the query that the user provided to the search provider 102 to generate one or more secondary result sets. The client 124, 126 and 128 receives the secondary result sets from the search engine 120 and 122, provides the data for the difference component 112 and optionally caches a copy on a client-side storage device, which may reside on the network 116 as a network attached storage ("NAS") or similar network storage.

Regardless of the manner in which the difference component 112 receives the primary and secondary result sets, the difference component 112 generates a difference result set indicating one or more differences between the primary result set and the secondary result set. The difference component 112 may generate the difference result set according to a variety of techniques. According to one embodiment, the difference component 112 performs URL matching on URLs contained in the primary result set and the secondary result set, whereby duplicate URLs are excluded from the difference result set. Alternatively, the difference component 112 may utilize "fingerprinting" techniques to create a signature or a fingerprint for a given page. Accordingly, where the fingerprint for a page in the primary result set is identical (or falls within a threshold of similarity), the page is excluded from the difference result set. Also, the difference component 112 may use knowledge of the structure of certain web sites and content sources 118 to determine where two pages or URLs identifying pages are the same. Those of skill in the art should recognize that other techniques for determining the similarity of two items are well known and may be utilized by the difference component 112 in generating the difference result set.

The difference component 112 generates the difference result set on the basis of the primary result set that the search engine 110 generates in response to the user's query, as well as one or more secondary result sets generated by search engines 120 and 122 that are located remotely from the search provider 102. According to one embodiment, upon selection of a user interface control by the user at the client 124, 126 and 128, the difference component 112 generates the difference result set, which the search engine 110 transmits to the client 124, 126 and 128 for display to the user. The user may interact with both the primary result set that the search engine 110 at the search provider 102 provides, as well as the difference result set that the difference component 112 provides. A user's queries and other interactions are maintained in a profile data store 115 as one or more user profiles. Alternatively, a client device 124, 126 and 128 may maintain a profile for a given user using a given client device, e.g., as a cookie.

The profile data store 115 maintains one or more profiles, each profile corresponding to a given user who may interface with the search provider 102 through the use of a client device 124, 126, and 128. A profile 113 for a given user maintains information regarding a given user, queries that the user submits to the search engine 110, a user's interaction with primary and secondary result sets, etc. A user profile may also maintain a user's preferred search engines 120 and 122 from which to retrieve secondary result sets for use in generation of a difference result set. Alternatively, the user's profile may maintain an indication of a default search engine 120 and 122, or the information in the user's profile may be analyzed to determine a predicted preferred search engine. A user profile may further maintain a threshold value used in generating a difference result set. The threshold value may be used to generate a difference result set comprised of results which appear above the threshold value in a primary result set and below the threshold value in a secondary result set.

According to one embodiment, the user may choose to view the difference result set by selection of a difference button or similar control that the search engine 110 provides as part of a search user interface, e.g., to view search queries and view result sets. The search engine 110 may selectively display the difference button to users, such that not all users are capable of displaying the difference result set. The determination of the set of users to whom the search engine 110 provides the difference button may be made on the basis of a number of factors. According to one embodiment, the difference button is shown to all users. According to another embodiment, the search engine 110 may analyze a given user's characteristics or a user profile for a given user in the profile data store 115 to determine if the difference button should be shown. The search provider 102 may also analyze server, ISP and other logs to determine whether search engine 110 should show the difference button to the users, e.g., determining those users who have recently switched to or from an alternate search provider. Alternatively, the search engine 110 may display the difference button only in response to certain queries the search engine 110 receives, e.g., queries to which the search engine 110 has received good feedback from users regarding the primary result set that the search engine 110 generates in response to the query. Geographical factors may also be employed. The determination may also be made on the basis of an actual, stored or predicted primary, secondary or difference result sets, including the items contained therein and the query terms in response to which a search engine or other component generates the result set. Those of skill in the art should recognize that a number of other access control factors may be taken into account or utilized in determining whether to present the difference button to a given user, and that these techniques fall within the scope of the present invention.

Figure 2:
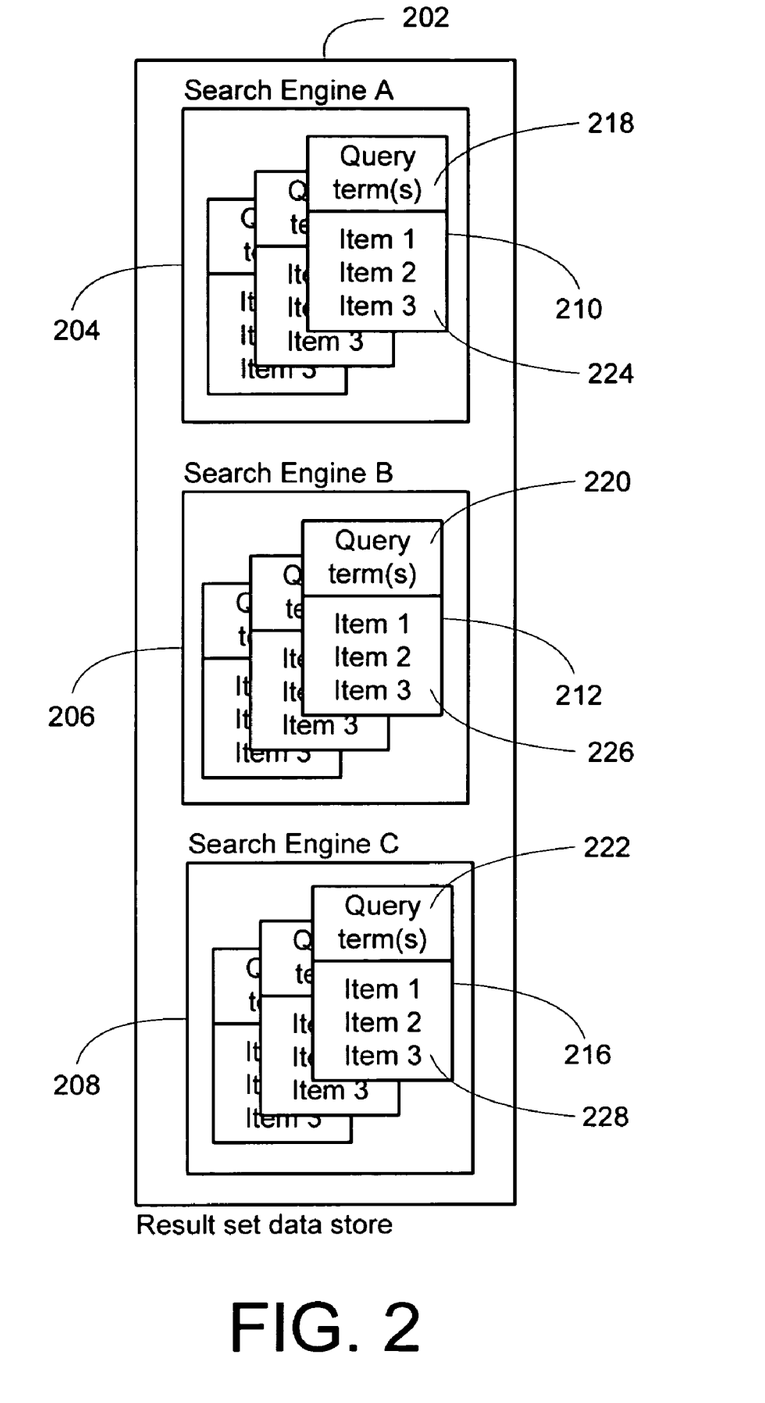
FIG. 2 is a block diagram illustrating a data store for the storage of one or more cached queries and associated result sets from one or more search engines according to one embodiment of the present invention.

As indicated above, the difference component 112 may utilize a result set data store 114 to maintain cached copies of secondary result sets from one or more search engines that are located remotely from the search provider. FIG. 2 presents a block diagram illustrating one embodiment of the result set data store. According to the data store 202 illustrated by FIG. 2, the data store 202 is delimited, partitioned or otherwise separated into a number of data structures on a per search engine basis 204, 206 and 208, e.g., a separate data structure for the result sets from each search engine.

A given one of the one or more per search engine data structures 204, 206 and 208 maintains past queries 210, 212 and 216 that users submit to the search provider's search engine. Each past query 210, 212 and 216 maintains the search terms comprising the search query 218, 220 and 222, as well as the secondary result set 224, 226 and 228 that a given search engine generates in response to the query. When the difference component receives a query and an associated secondary result set from a given search engine, the query and secondary result set are written to the proper per search engine data structure 204, 206 and 208. For example, assume that a given user executes a query for the search terms "Labrador retriever puppy adoption" at the search provider's search engine. The difference component, according to one or more previously described techniques, receives a secondary result set for the query from search engine B 206. The difference component writes the search terms from the query, as well as the secondary result set, to the per search engine data structure for search engine B 206 in the result set data store 202. Accordingly, when the difference component must generate a difference result set, it may query the result set data store 202 for a given query 210, 212, 216 determine a secondary result set 224, 226, 228 from a given search engine 204, 206 and 208, as opposed to retrieving the secondary result set from the required search engine at runtime. It should also be noted that as users repeat execution of a given query 210, 212 and 216, the secondary result set for the query 224, 226 and 228 may be updated to reflect changes in the search algorithms used by search engines in generating the secondary result sets 224, 226 and 228.

Figure 3:
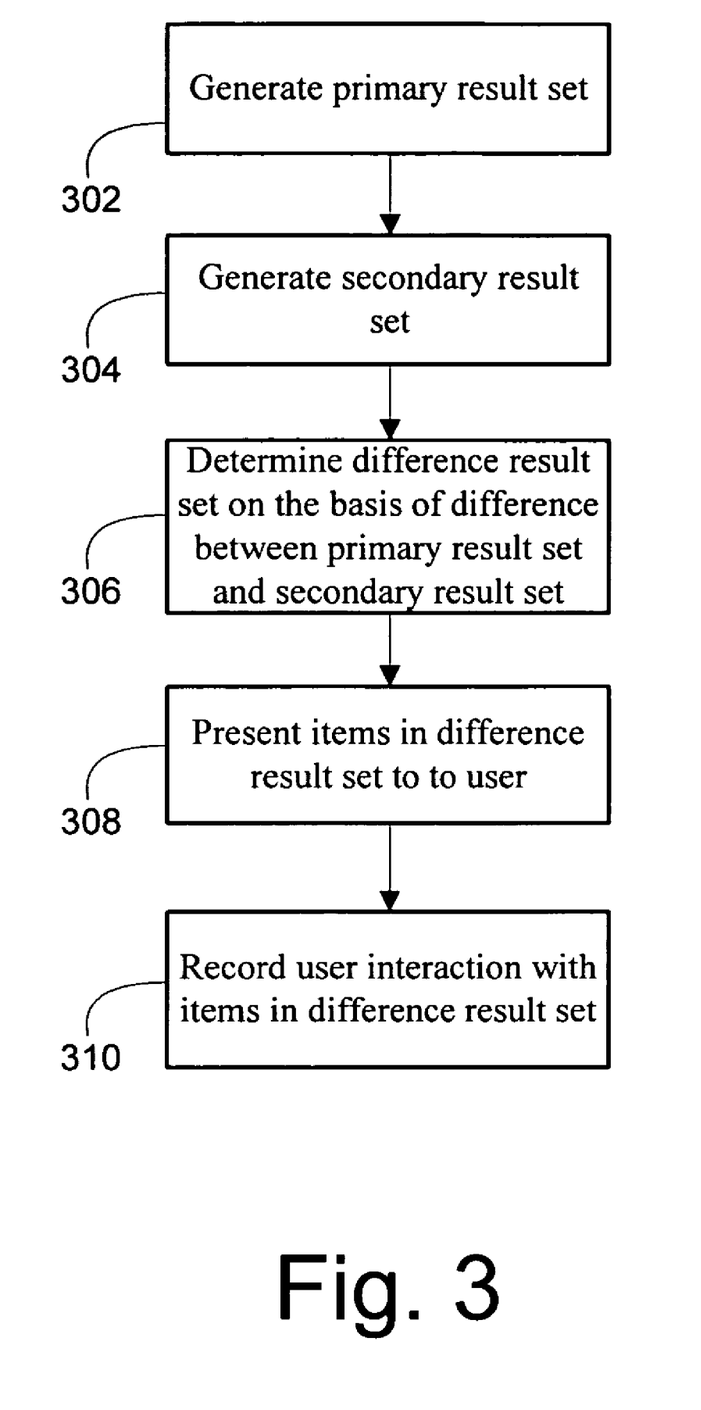
FIG. 3 is a flow diagram illustrating a method for the generation and presentation of, as well as interaction with, a difference result set generated on the basis of a difference between a primary result set and a secondary result set according to one embodiment of the present invention.

One embodiment of a method for operating the system presented in FIG. 1 for generating and presenting a difference result set on the basis of a difference between a primary result set and a secondary result set is illustrated in FIG. 3. According to the flow diagram of FIG. 3, a method for generating and presenting a difference result set comprises generating a primary result set by a first search engine, step 302, which may generate the primary result set by applying a first search algorithm to a corpus of documents, e.g., HTML files, audio, video, text and combinations thereof. The method further comprises the generation of a secondary result set by a second search engine, step 304, which may generate the secondary result set by applying a second search algorithm to a corpus of documents.

The primary and secondary result sets are used to determine a difference result set on the of one or more differences between the primary result set and the secondary result set, step 306. According to one embodiment, the difference result set comprises a listing of a top number of results in the secondary result set, e.g., the top twenty items in the secondary result set. The difference result set further comprises items from the primary result set that match items in the secondary result set but differ in the rank assigned to the item. Table A presents an illustration of this exemplary difference result set:

TABLE A

| Search Engine A | Search Engine B | URL |
| --- | --- | --- |
| 1 | 5 | www.urlA.com |
| 2 | 7 | www.urlB.com |
| 3 | 3 | www.urlc.com |
| 4 | 1 | www.urld.com |
| 5 | 4 | www.urle.com |
| 6 | — | www.urlf.com |
| 7 | — | www.urlg.com |

The difference result set may be stored in a persistent storage device, such as a hard disc drive, for presentation to the users requesting the difference result set generated on the basis of differences between a primary result set and a secondary result set, step 308. The system may record a user's interaction with items in the difference result set, step 310, which may be used in weighting certain URLs when generating the primary result set. For example, where users consistently select the URL that is the number one search result from the difference result set that is not the number one result in the primary result set, the search engine may weight the URL such that it is assigned a higher rank in the primary result set.

Figure 4:
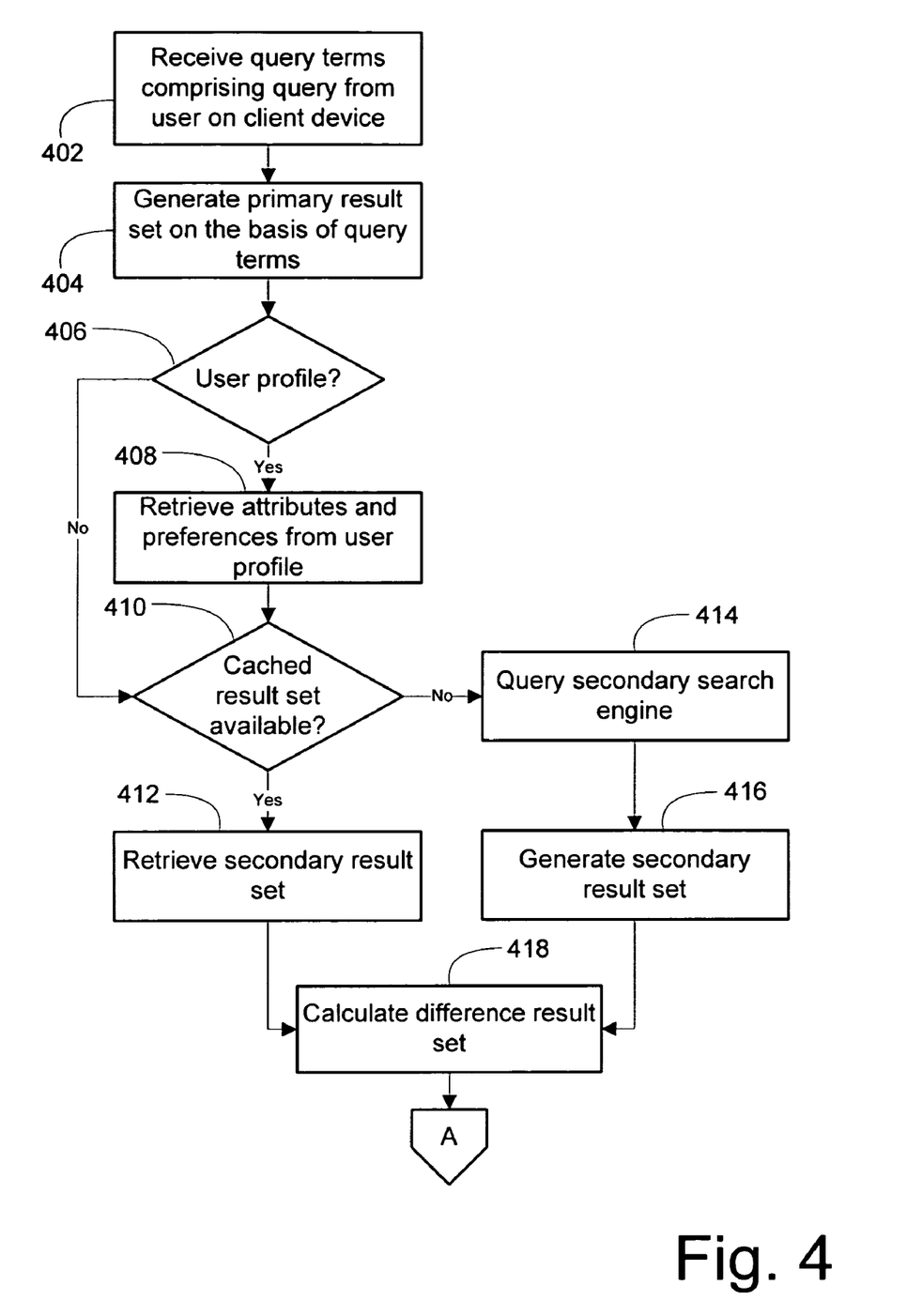
FIGS. 4 and 5 are flow diagrams illustrating a method for the generation and presentation of, as well as interaction with, a difference result set generated on the basis of a secondary result set according to one embodiment of the present invention.

FIG. 4 presents an alternative embodiment of a method for generating and presenting a difference result set on the basis of a difference between a primary result set and a secondary result set. According to the method of FIG. 4, one or more query terms comprising a query are received from a user on a client device, step 402. The system, e.g., through the use of a search engine at a search provider, generates a primary result set on the basis of the query terms that the user supplies, step 404. The system performs a check to determine if a profile exists for the given user submitting the search query, step 406. Where a user profile exists, step 406, the system retrieves the user's attributes and preferences from the user profile, step 408. The user profile may identify one or more preferred search engines to use for generating a secondary result set. Where no user profile exists, step 406, or where the user profile does not identify a preferred search engine, step 408, a default preferred search engine is selected, which may be based on attributes in a user profile.

The system identifies a preferred search engine, either from a user profile or by selecting a default preferred search engine, and performs a check to determine if a cached result set exists from the preferred search engine for the received query, step 410. Where a cached result set from the preferred search engine for the received query exists, step 410, the secondary result set is retrieved, step 412. Where a cached result set from the preferred search engine for the received query does not exist, step 410, a secondary search engine is queried with the query terms received from the user, step 414. In response, the secondary search engine generates a secondary result set, step 416. A difference result set is generated on the basis of one or more differences between the primary result set and the secondary result set, step 418. For example, assume that the user submits the query terms "Harry Potter". A first search engine generates a primary result set. Where no cached result set exists from a preferred search engine, the preferred search engine generates a secondary result set, which is used in conjunction with the primary result set to generate a secondary result set.

Figure 5:
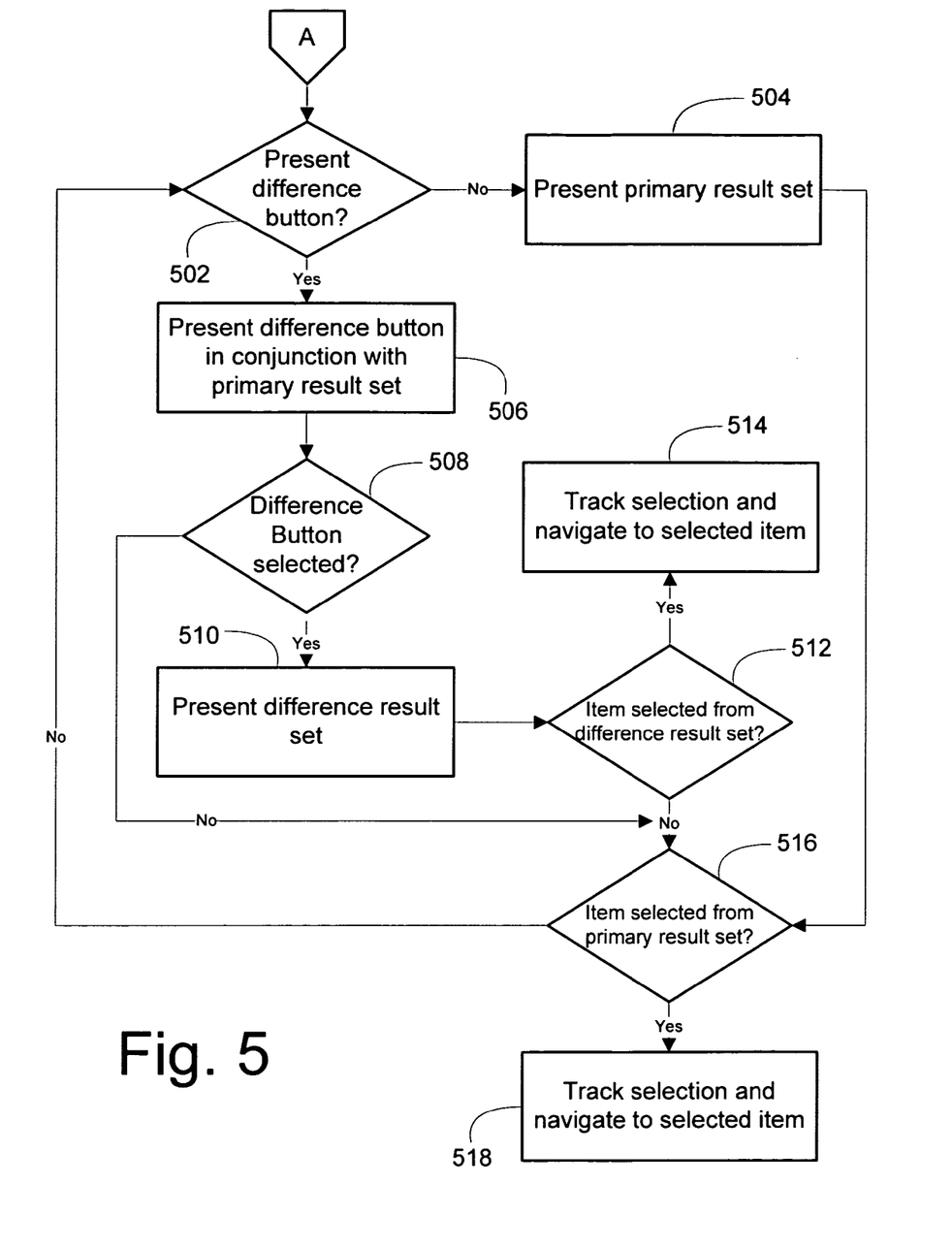

Continuing with FIG. 5, the system performs a check to determine if a difference button or control should be displayed in conjunction with the user interface used to display the primary result set or other user interface, step 502. The decision whether or not to present a difference button, step 502, may be made on the basis of a number of factors. For example, the difference button may be displayed where the user is a registered user, on the basis of information in a user's profile, on the basis of geography or location, etc. According to one embodiment, a registered user is a user from which the system obtains information with which to recognize the user when he or she is accessing the system.

If the system determines that the difference button should not be presented, step 502, the system simply presents the primary result set, step 504. A check is performed to determine if the user selects an item from the primary result set, step 516. Where the user selects an item from the primary result set, step 516, the user navigates to the selected item, which may include tracking an indication of the selection in the user profile for the given user making the selection, step 518. Where no item is selected, step 516, processing returns to steps 502 and 504, with continued presentation of the primary result set.

Where the system determines that it is to present the difference button to the user, step 502, the system presents the primary result set in conjunction with a difference button or other control, step 506. A check is performed to determine if the user selects the difference button, step 508. Where the user has not selected the difference button, step 508, the system performs a check to determine whether the user has selected an item from the primary result set, step 516. Where the user has selected neither the difference button, step 508, nor an item from the primary result set, step 516, the system awaits user input.

Where the user selects the difference button, step 508, the difference result set is presented to the user, step 510. The system may present the difference result set in a number of ways, including, but not limited to, a dialog box, a separate browser window, within a dedicated portion of the interface in which the system presents the primary result set, etc. The system performs checks to determine if the user selects an item from the difference result set, step 512, or from the primary result set, step 516. Where the user does not make any selection, the system awaits user input. If the user selects an item from the difference result set, step 512, the system tracks the selection, which may include tracking the selection in a user profile for the given user, and navigates to the selected item, step 514. Similarly, if the user selects an item from the primary result set, step 516, the system tracks the selection and navigates to the selected item, step 518. As discussed above, tracking of the selection of items in the difference result set may allow the system to use these data in influencing the searching for and ranking of documents, including, but not limited to text, audio, video, images and combinations thereof.

Figure 6:
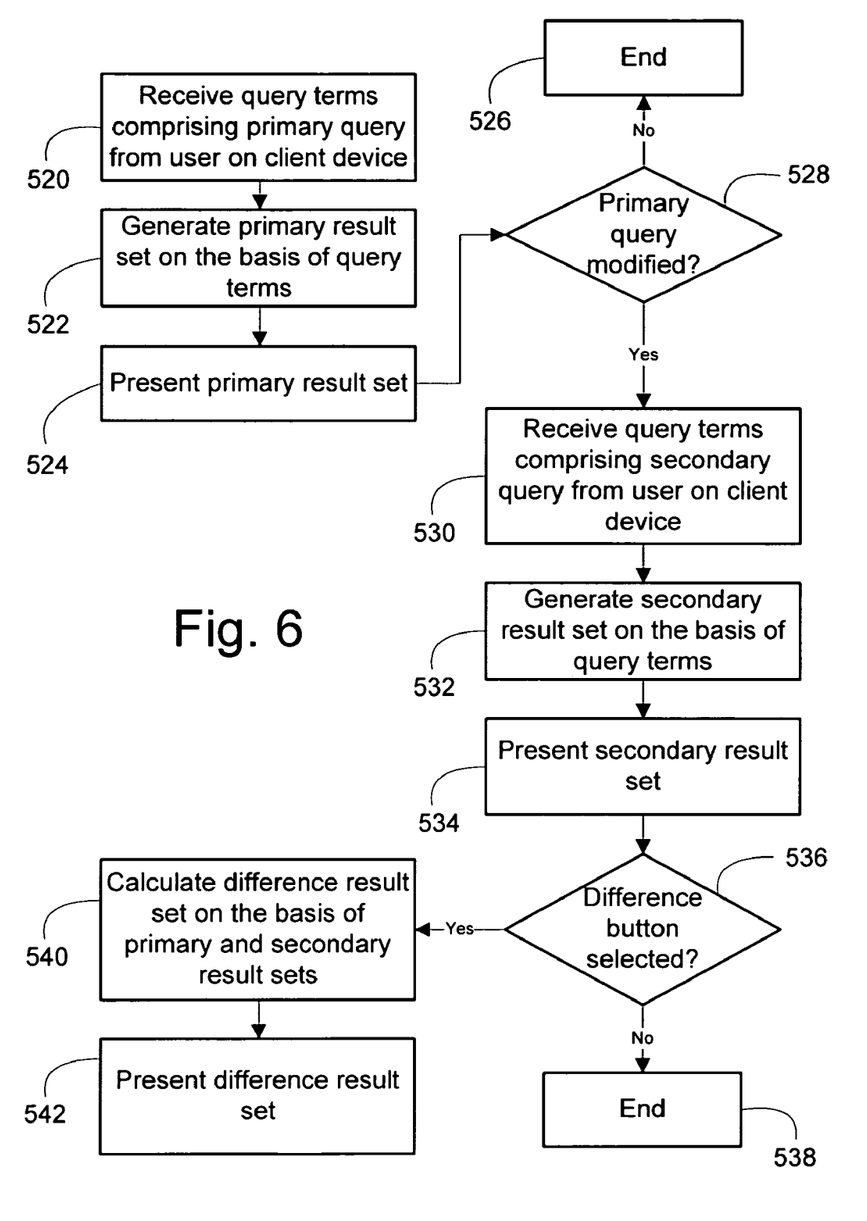
FIG. 6 is a flow diagram illustrating a method for the generation and presentation of a difference result set generated on the basis of multiple sequential queries according to one embodiment of the present invention.

In addition to the foregoing, the system of the present invention may also determine and present a difference result set to a user on the basis of searches that the user is conducting at a primary search engine. FIG. 6 presents a flow diagram illustrating one embodiment of a method for the presentation of a difference result set that the system generates on the basis of multiple queries, which may be sequential queries. According to the embodiment of FIG. 6, a search engine receives a primary query that comprises one or more query terms from a user interacting with a client device, step 520. Alternatively, an automated system or other software process may provide the query terms in the primary query to the search application.

The system receives the primary query and generates a primary result set on the basis of the query terms, step 522, and presents items in the primary result set to the user using the client device, step 524. The user submits a secondary search query and the system performs a check to determine if the user is modifying the search terms in the primary query, step 528. For example, where the primary query comprises the term "golf" and the system receives a subsequent query from the user for "golf shoes", the check at step 528 evaluates to true. It should be noted that the check that the system performs at step 528 is optional, and the system may execute the method illustrated at FIG. 6 where a secondary or any subsequent queries are not modifications of the primary query. According to the present embodiment, where the user is not modifying the primary query, step 528, the process ends, step 526.

The system receives the query terms comprising the secondary query from the user interacting with the client device, step 530. The system generates a secondary result set on the basis of the query terms, step 532, and presents items in the secondary result set to the user using the client device, step 534. The interface that is presenting the items in the secondary result set to a user may also present a difference button, the selection of which causes the generation and presentation of a difference result set. A number of factors may influence the decision of whether to present the difference button, including, but not limited to, a determination that a user is a registered user of the system, past observed behavior of the user, etc. A check is performed to determine if the user has selected the difference button, step 536.

Where the user selects the difference button, step 536, processing continues at step 540 with the system determining a difference result set on the basis of the primary and secondary results sets, which are responsive to the primary and secondary queries, respectively. The system may determine a difference result set according to the techniques discussed in connection with other embodiments or known to those of skill in the art, e.g., according to URL matching techniques. An interface presents the difference result set to the user using the client device, step 542, through which the user may interact with the difference result set, such as by selecting items in the difference result set. Selection of the difference button may be recorded to create a profile of a user's past behavior, which may also include the user's interaction with the difference result set. According to one embodiment, the method excludes the presentation of the secondary result set and check for selection of the difference button, steps 534 and 536, respectively, and instead proceeds directly to the determination and presentation of the difference result set, steps 540 and 542, respectively.

According to alternative embodiments of the invention, the system may determine one or more difference result sets for multiple sequential queries, e.g., performing a loop similar to that performed in the generation of a secondary result set (steps 536 through 528) for each sequential query. By generating multiple result sets, which may include the generation of multiple sequential result sets on the basis of a series of modified queries, the method may determine multiple difference sets, as well as provide the user with controls for the same. For example, where the user executes a tertiary query, a secondary difference result set may be determined on the basis of differences between items in the difference result set and items in the tertiary result set, which is generated in response to the tertiary query. The process of the present embodiment ends where the user does not select the difference button, step 538.

Figure 7:
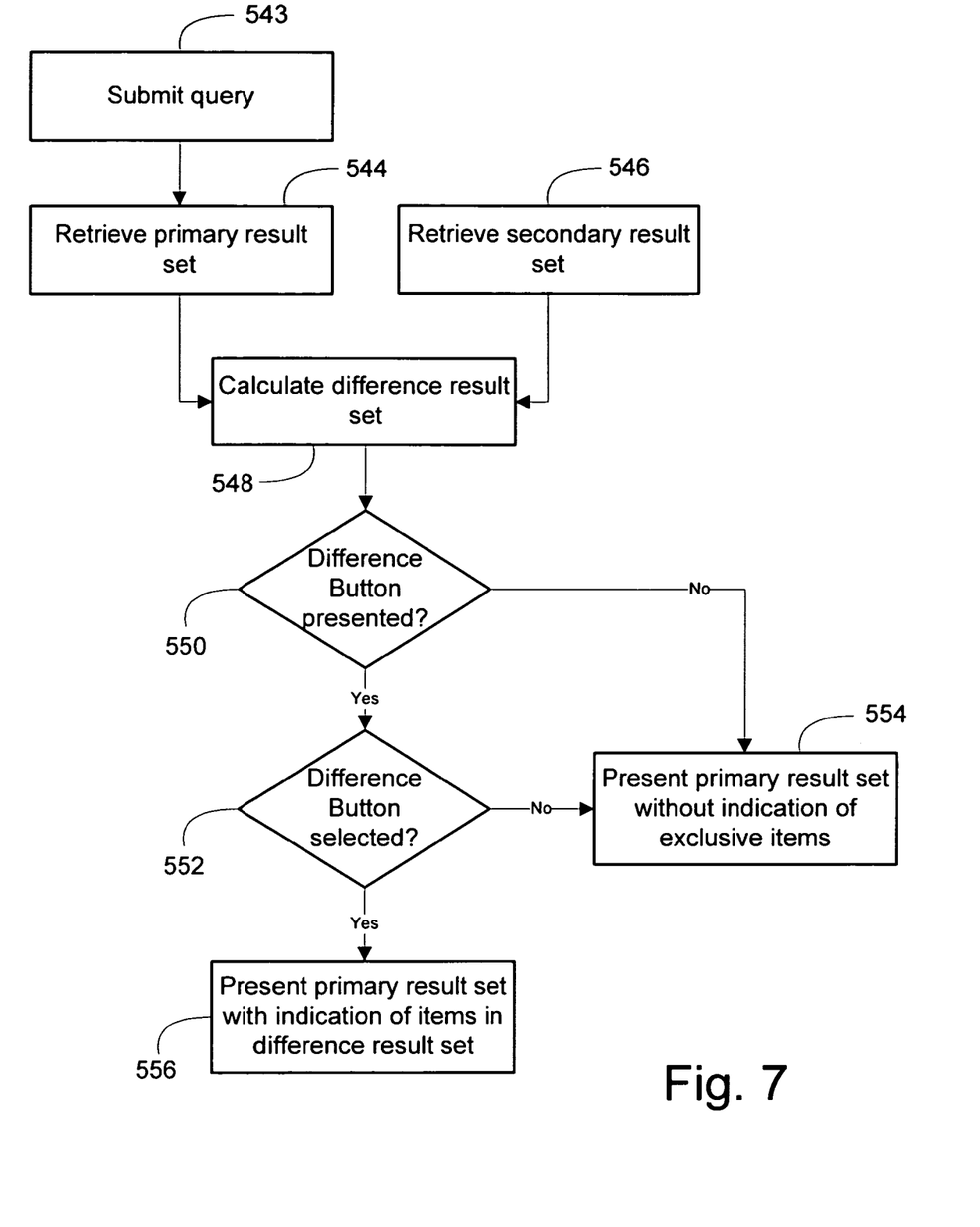
FIG. 7 is a flow diagram illustrating a method for determining and indicating items in a difference result set in conjunction with items in a primary result set according to one embodiment of the present invention.

The system of the present invention may also provide an indication to the user of the items in a primary result set that are also contained in a difference result set. The flow diagram of FIG. 7 illustrates one embodiment of a method for determining and indicating items in a difference result set that are either exclusive to a primary result set or that are ranked above a threshold rank in a primary result but below the threshold in a secondary result set. For example, when a user is utilizing a primary search engine to generate a primary result set to a query, the system of the present invention may be used according to the method of FIG. 7 to indicate items in the primary result set that are not contained in a secondary result set generated by a secondary search engine. Additionally, the system of the present invention may be used according to the method of FIG. 7 to indicate items ranked above a threshold value rank in a primary result set and not ranked above the same threshold value in a secondary result set. The threshold may be predefined or may read from a user profile.

According to the method of FIG. 7, a user submits a query, step 543, and the system retrieves a primary result set, step 544. Retrieving the primary result set may comprise generating the primary result set using a first search engine, which may utilize a first search algorithm. Similarly, the system retrieves a secondary result set, step 546, which may comprise generating the secondary result set using a second search engine. The secondary search engine may utilize a search algorithm that is different from the first search algorithm. The choice of the secondary search engine may be made in a number of ways, including, but not limited to, an indication in a user profile, choosing from a set of potential secondary search engines, selecting a default secondary search engine, etc. A difference result set is generated on the basis of one or more differences between the primary result set and the secondary result set, step 548.

An interface may present a user with a difference button or similar control that allows the user to indicate items in the difference result set, step 550. Alternatively, the user may set a preference in his or her user profile to determine whether the interface is to display the difference button. Where the user is not shown the difference button, step 550, the system presents the user with the primary result set and refrains from indicating the items in the difference result set, e.g., items in primary result set that are not present in the secondary result set, step 554.

Where the difference button is presented, step 550, the system performs a check to determine if the user selects the difference button, step 552. Where the user selects the difference button, step 552, the system presents the primary result set with an indication of the items in the difference result set, step 556. The indication may comprise text, animation, video, images, such as an icon, etc. If the user does not select the difference button, step 552, the system presents the user with the primary result set and refrains from indicating the items in the difference result set, step 554.

Those of skill in the art recognize that the method may enter a loop at step 554 whereby the system continues to check to determine if the user selects the difference button, step 552, causing the presentation of an indication of items in the difference result set, step 556. Those of skill in the art should further recognize that the method of FIG. 7 may operate such that the secondary result set is retrieved, steps 544 and 546, respectively, and a difference result set calculated and used to present exclusive items, steps 548 and 556, respectively, subsequent to presentation and selection of the difference button. The method of FIG. 7 may also operate in a mode such that the items in the difference result set are indicated either by default or in response to the display of the difference button whereby selection of the difference button allows the user to toggle the presentation of the one or more indications on and off.

Figure 8:
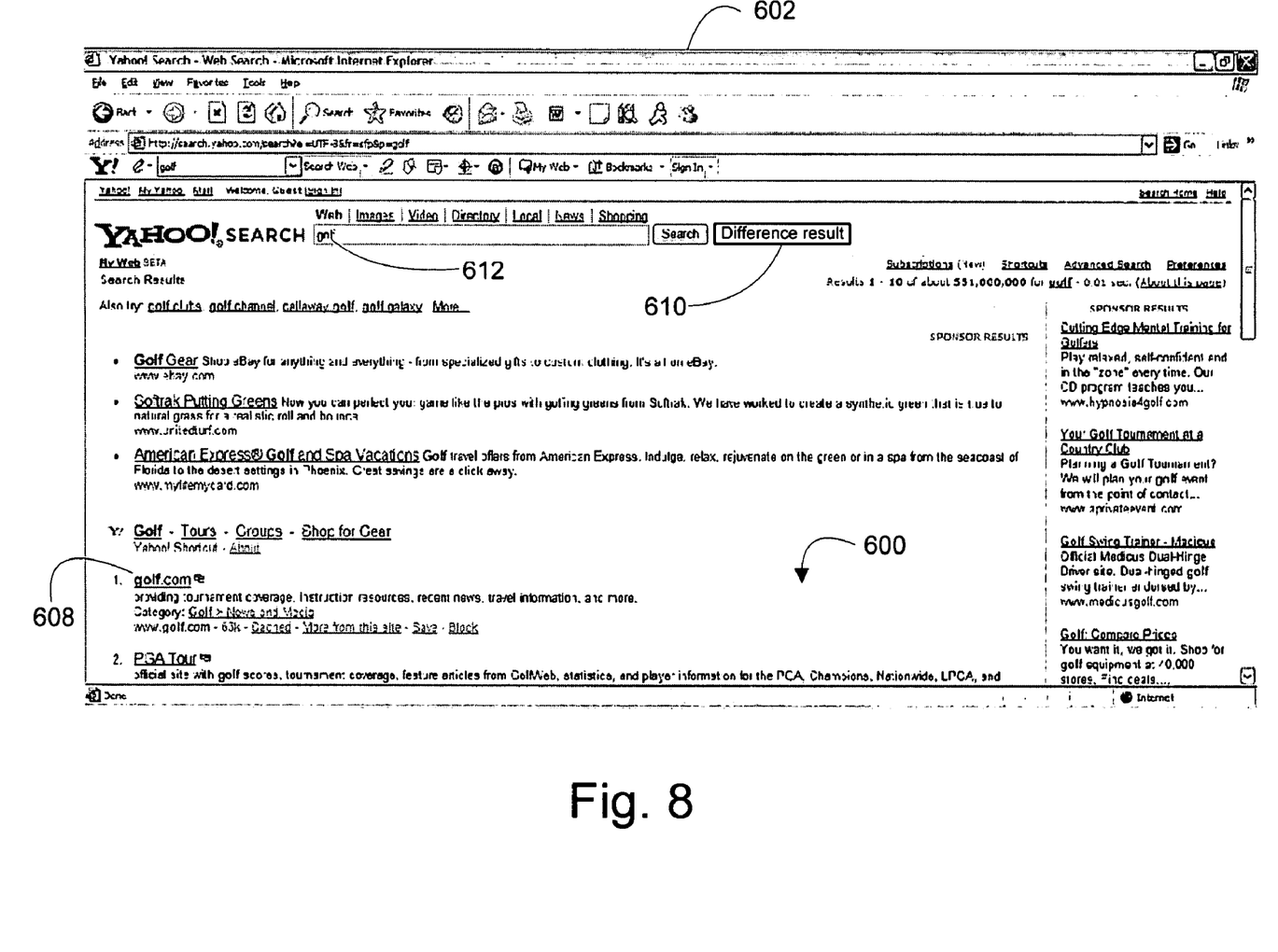
FIG. 8 is a screen diagram illustrating the presentation of a primary result set generated by a search engine in conjunction with a control for generating and presenting a difference result set according to one embodiment of the present invention.

The system may present the difference button or similar control in conjunction with a primary result set, as illustrated at FIG. 8. According to the screen diagram presented by FIG. 8, a web browser 602, which may be executing on a client device, receives a web page 600 that comprises a primary result set that the system generates in response to the user's query 612. The system ranks items 608 in the primary result set according to one or more ranking algorithms. The user interface that the web page 600 provides comprises a difference button 610, the selection of which causes the presentation of a difference result set, which may include generation of the difference result set.

Figure 9:
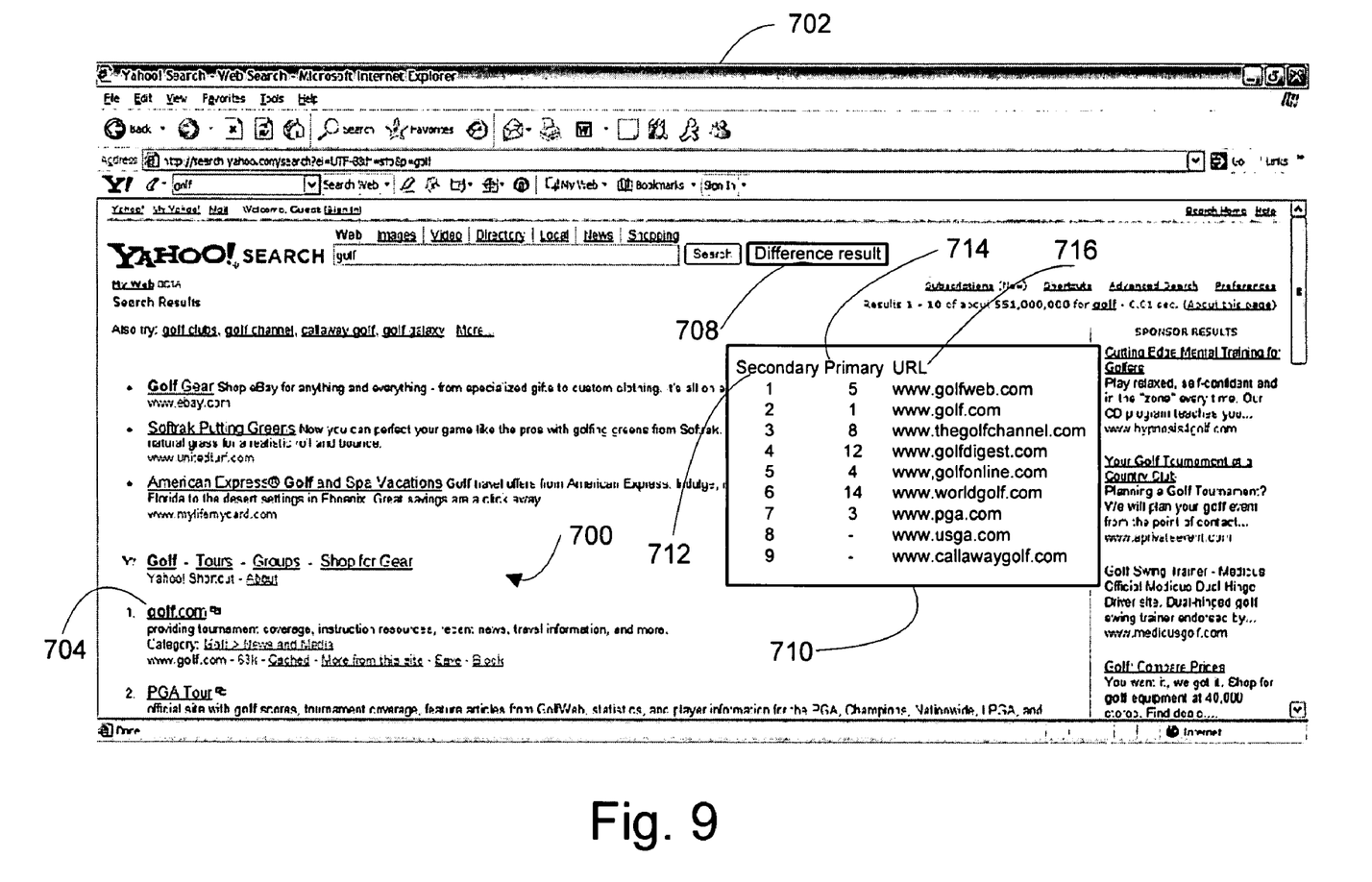
FIG. 9 is a screen diagram illustrating the presentation of a primary result set in conjunction with a difference result set according to one embodiment of the present invention.

FIG. 9 illustrates the presentation of a difference result set 710 in conjunction with a primary result set 704. A web browser 702 executing on a client device receives a web page 700 comprising a primary result set 704 and a difference button 708, in addition to other information and user interface components. Selection of the difference button 708 initiates presentation of a difference result set 710. According to the embodiment of FIG. 8, the difference result set 710 is rendered in a dialog box presented in conjunction with the primary result set, although those of skill in the art recognize other techniques for the presentation of information in a windowing environment may be utilized. The difference result set 710 comprises a listing of the top nine results 712 from a search engine other than the search engine utilized to generate the primary result set 704, e.g., the secondary result set. The difference result set also provides the corresponding rank that the given item in the secondary result set occupies in the primary result set 714, as well as the URL for the item 716. Selection of a URL 716 by the user results in the system tracking the selection of the URL 716 and the browser 702 navigating to the selected URL 716.

Figure 10:
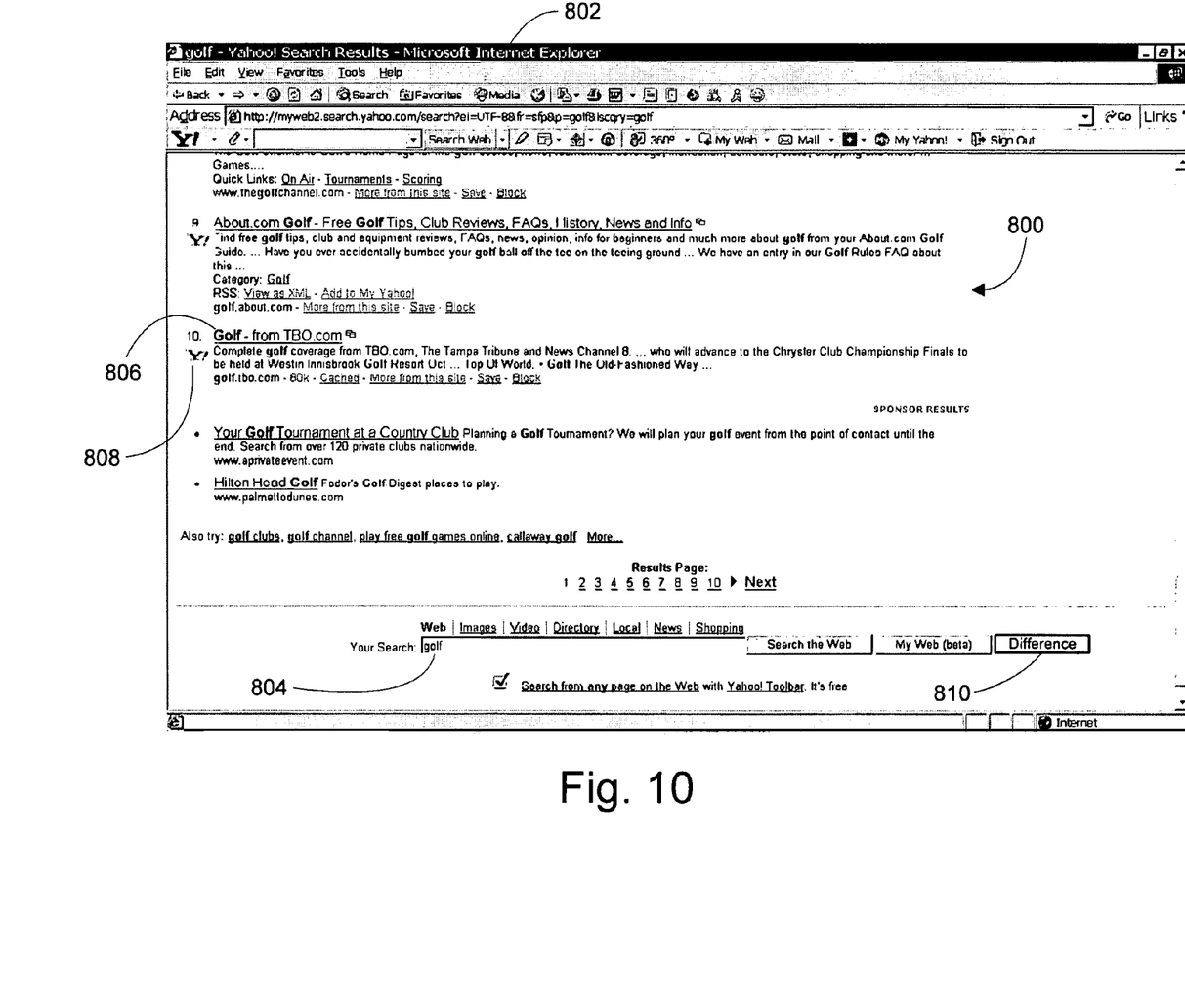
FIG. 10 is a screen diagram illustrating the presentation of a result set by a search engine with an indication of items in the result set that are exclusive to the search engine according to one embodiment of the present invention.

FIG. 10 presents a screen diagram illustrating an indication of items in a result set that are exclusive to a primary search engine that is generating the result set, e.g., a result set from a secondary search engine does not contain the item in the result set from the primary search engine or an item ranked above a threshold value in a primary result set appears below the threshold value in a secondary result set. A web browser 802 executing on a client device receives a web page 800 comprising a primary result set that the system generates in response to the user's query 804, in addition to other information and user interface components. The system ranks items 806 in the primary result set according to one or more ranking algorithms. The user interface that the web page 800 provides also comprises an indication 808 of any items in the primary result set 806 that are not contained in a secondary result set. A difference button 810 allows the user to toggle the display of the indication 808 of the exclusive items.

While the invention has been described and illustrated in connection with preferred embodiments, many variations and modifications as will be evident to those of skill in the art may be made without departing from the spirit and scope of the invention, and the invention is thus not to be limited to the precise details of methodology or construction set forth above as such variations and modification are intended to be included within the scope of the invention.

We claim:

1. A method for influencing a result of a search algorithm in generating a result set, the method comprising:
   receiving a primary result set and a secondary result set in response to a search query, the primary result set and secondary result set each comprising one or more items, wherein the items are related to one or more of: audio content, video content, text content and image content;
   determining a difference between the one or more items in the primary result set and the one or more items in the secondary result set for storage as a difference result set, including determining the difference according to URL matching, the difference result set: (1) containing the one or more items in the secondary result set that is not included in the primary result set; (2) containing the one or more items in the primary result set that is included in the secondary result set; and (3) excluding one or more items in the primary result set not included in the secondary result set;
   selecting an item in the difference result set;
   storing an indication of the selected item for use in influencing items contained in a result set;
   presenting a search result to a user;
   eliciting feedback from the user regarding the selection of the item in the difference result set; and
   merging a rank of the selected item corresponding to the difference result set into the primary result set based on the elicited feedback from the user.

2. The method of claim 1 wherein receiving the primary result set comprises a first search engine generating the primary result set and a second search engine generating the secondary result set.

3. The method of claim 1 wherein generating the primary result and the secondary result set comprises generating the primary result set according to a first search algorithm and generating the secondary result set according to a second search algorithm.

4. The method of claim 1 wherein determining the difference comprises:
   crawling one or more pages identified by one or more items in the primary result set and the secondary result set to determine one or more page signatures;
   comparing the one or more page signatures to determine a duplicate page; and
   eliminating the duplicate page from the difference result set.

5. The method of claim 1 comprising:
   computing the primary result set and the secondary result set in advance of a receipt of a user query; and
   storing the primary result set and the secondary result set on a data storage device.

* * * * *